United States Patent

[11] 3,582,559

[72] Inventors Myron H. Hitchcock
Reston;
Warren L. Holford, Fairfax; Robert F. Owens, Vienna, all of, Va.
[21] Appl. No. 817,892
[22] Filed Apr. 21, 1969
[45] Patented June 1, 1971
[73] Assignee Scope Incorporated
Reston, Va.

[54] METHOD AND APPARATUS FOR INTERPRETATION OF TIME-VARYING SIGNALS
6 Claims, 6 Drawing Figs.

[52] U.S. Cl. .......... 179/15B, 179/15.55R
[51] Int. Cl. .......... G10l 1/00
[50] Field of Search .......... 179/15B, 15.55TC

[56] References Cited
UNITED STATES PATENTS

| | | | |
|---|---|---|---|
| 3,204,030 | 8/1965 | Olson et al. | 179/1 |
| 3,321,710 | 5/1967 | Dunnican | 328/55 |

OTHER REFERENCES

Speech Analysis Synthesis and Perception , Vol. 3, Academic Press, N.Y., 1965, pages 273— 275

*Primary Examiner*—Kathleen H. Claffy
*Assistant Examiner*—Horst F. Brauner
*Attorney*—John E. Benoit

ABSTRACT: A technique for recoding time-varying signals as a function of the rate of change of those signals to accurately present such data in a format suitable for input to a pattern recognition system. An isolated incoming command signal is sensed and accumulated in its entirety. The command signal is then compressed into a fixed number of pseudospectra. This fixed size pattern is then compared to a set of patterns representing the various command signals the device was trained to recognize.

INVENTOR.
MYRON H. HITCHCOCK
WARREN L. HOLFORD
ROBERT F. OWENS

INVENTOR.
MYRON H. HITCHCOCK
WARREN L. HOLFORD
ROBERT F. OWENS

INVENTOR.
MYRON H. HITCHCOCK
WARREN L. HOLFORD
ROBERT F. OWENS

INVENTOR.
MYRON H. HITCHCOCK
WARREN L. HOLFORD
ROBERT F. OWENS

INVENTOR.
MYRON H. HITCHCOCK
WARREN L. HOLFORD
ROBERT F. OWENS

INVENTOR.
MYRON H. HITCHCOCK
WARREN L. HOLFORD
ROBERT F. OWENS

METHOD AND APPARATUS FOR INTERPRETATION OF TIME-VARYING SIGNALS

This invention broadly relates to the interpretation of time-varying signals such as speech utterances and more specifically to the accurate presentation of such data in a format suitable for input to a pattern recognition system.

Many systems have been proposed for obtaining automatic speech recognition in the field of acoustics and data processing. However, all systems, to our knowledge, have possessed extreme limitations which present problems of a nature serious enough to prevent any widespread usage of these devices. It is obvious that a truly reliable system of this kind which would handle a large number of words and at the same time be insensitive to various speech variations would be highly useful in many modern-day fields.

One of the basic problems encountered in the systems mentioned above lies in the face that while various components of speech may be recognized, the actual interpretation of such data as produced by the recognition system has been one of the stumbling blocks to providing an efficient and relatively problem-free system.

Accordingly, it is an object of this invention to provide a method of and apparatus for interpreting time-varying signals, such as speech utterances.

A further object of this invention is to provide a method of and apparatus for time-varying signal representation which provides data format suitable for input to a pattern recognition system.

These and other objects of this invention will become apparent from the following description when taken in conjunction with the drawings wherein.

FIG. *3a*, *3b* is a logic diagram of a specific implementation of the coding compressor of the present invention; and FIG. *4a*, *4b* is a logic diagram of a specific implementation of the timing and control system of the present invention.

Broadly speaking, the present invention represents time-varying signals in a data format suitable for input to a pattern recognition system. The coding process of the invention effectively recodes signal data as a function of the rate of change of that data. It is to be understood that the broad concepts of the invention are not specifically limited to a unit for interpreting speech utterances.

Figure 1:
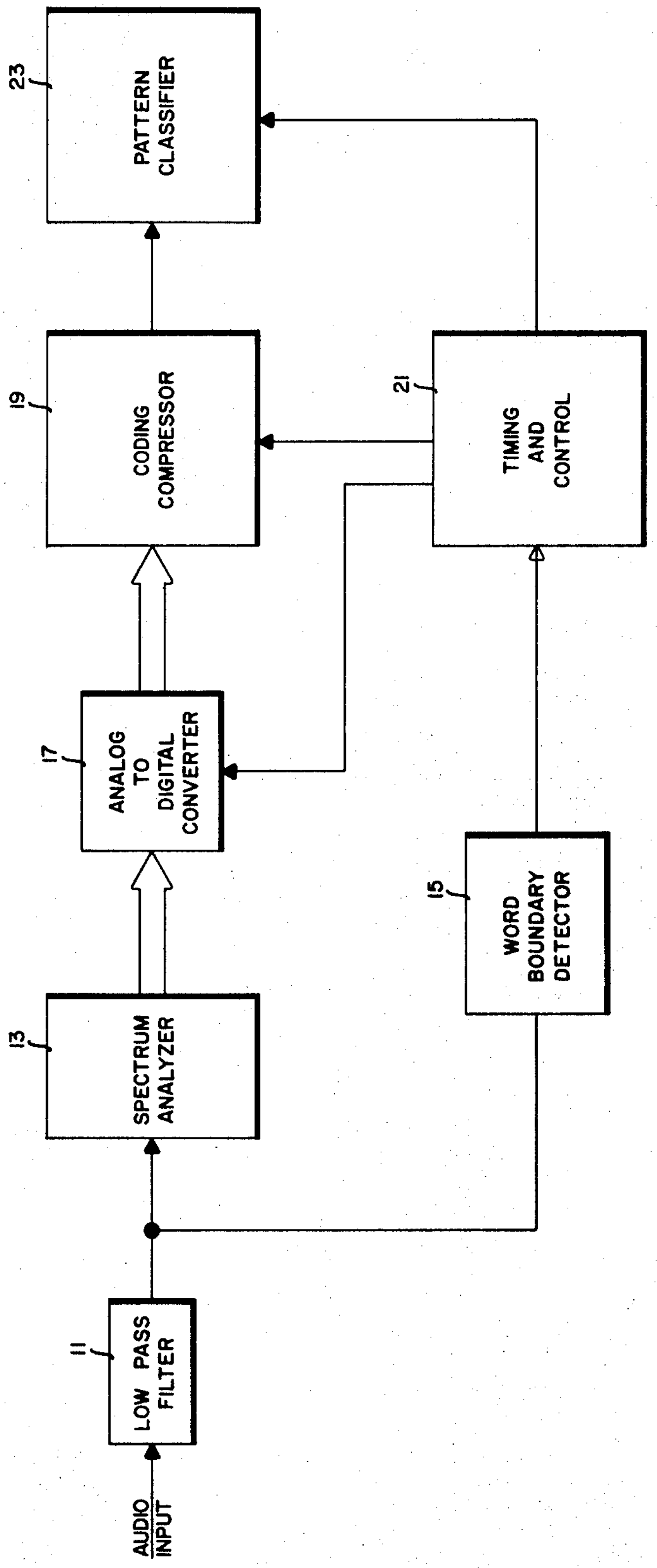
FIG. 1 is a basic schematic presentation of the system of the present invention.

Turning now more specifically to the drawings, there is shown in FIG. 1 a speech input to a low-pass filter 11 which is in turn coupled to the input of a filter spectrum analyzer 13 and a word boundary detector 15. The spectrum analyzer 13 is a well-known component and in the specific instance described hereinafter relates to a 16 element filter spectrum analyzer. Likewise, the word boundary detector may be any of the well-known detecting devices for providing this particular information, such as the VOX system as discussed in *The Radio Amateur's Handbook*, 39th Edition, 1962, p. 327.

The output of the spectrum analyzer 13 is converted from an analog-to-digital signal by converter 17 and transferred to the coding compressor 19. Compressor 19 will be discussed in detail hereinafter. The output of the coding compressor is then supplied to a known pattern classifier 23.

The function of the work boundary detector 15 is to gate the output of the coding compressor through a timing and control circuit 21 which is also coupled to converter 17 and to pattern classifier 23.

The word boundary detector 15 brackets isolated utterances by sensing the onset and subsequent exit of spectral energy characteristics of speech measurements. The time bracket begins immediately at the receipt of spectral energy and ends a prescribed time period after no energy is sensed. The delay is necessary to enable the detector to encompass the explosive gaps in the middle of many words.

For purposes of clarity the invention will first be described in terms of data flow and subsequently in terms of the logic diagram of a specific implementation.

Figure 2:
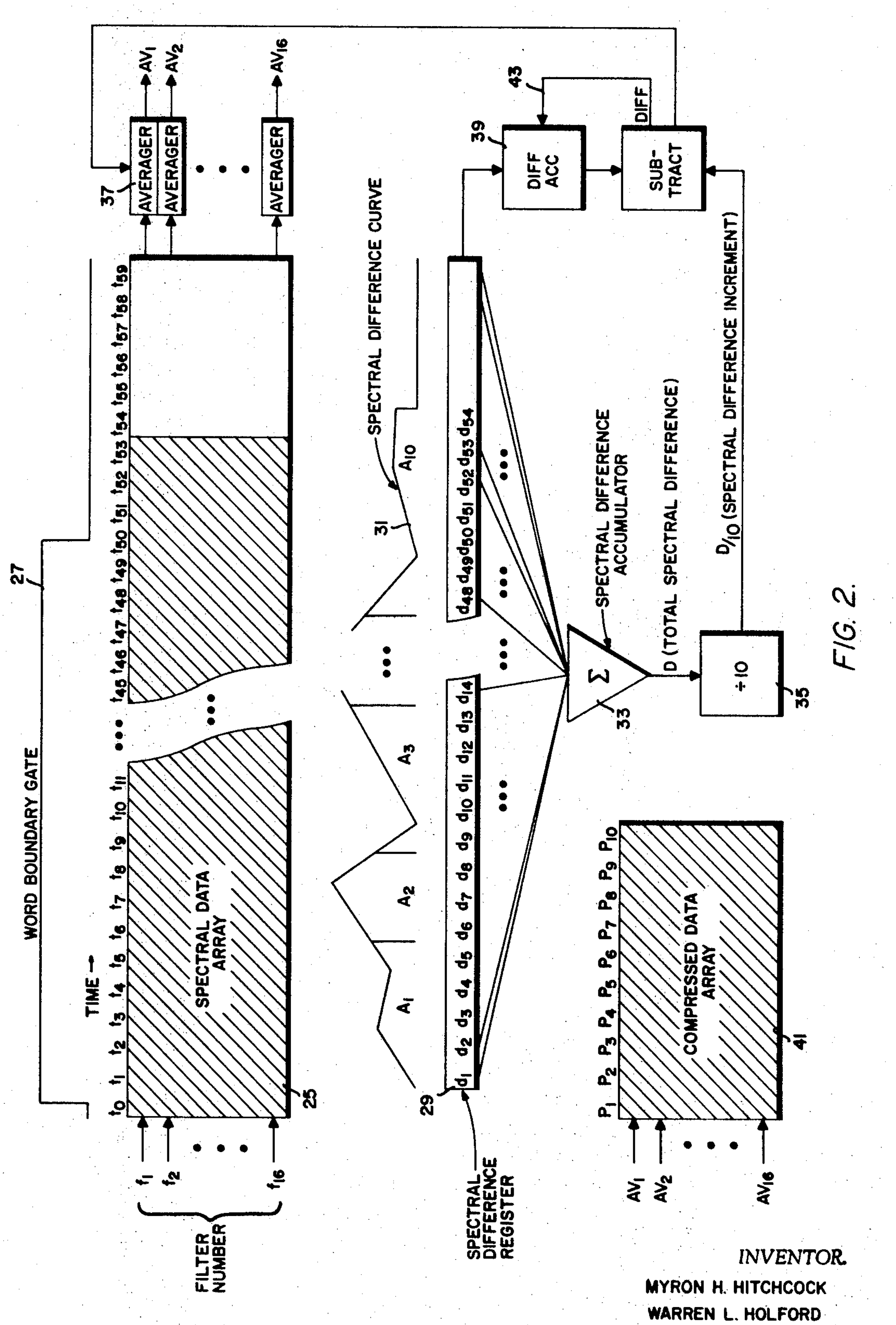
FIG. 2 is an illustrative showing of the data flow of the basic components of the present invention.

FIG. 2 relates to the data flow of the data arrays associated with the coding compressor 19 as they would appear after a speech utterance has been gated in the system by the word boundary detector 15. The accepted data indicated as inputs between frequencies $f_1$ through $f_{16}$ is shown in a spectral data array 25 as the shaded area to illustrate an input from a particular utterance as controlled by the work boundary detector shown as curve 27. For the sake of illustration, there is shown an array with a capacity of 60 spectra representing 1 second of time. Each spectrum consists of the amplitude detected outputs of a plurality of band-pass filters. In the example shown in FIG. 2, the word boundary gate has been indicated to be on from a time $t_0$ to $t_{50}$. Three spectra are buffered prior to activation of the word boundary detector. Thus, a total of 54 spectra have been stored for this specific utterance. The number of spectra stored for individual utterances may vary from 10 to 60 depending upon the time duration of the utterance. The compressor 19 reduces each utterance to a sequence of exactly 10 pseudospectra, referred to hereinafter as a compressed data array 41, regardless of the length of the specific utterance. This reduction is accomplished as follows:

Differences between successive spectra in the spectral data array 25 are computed according to the equation $$d_i=\sum_{j=1}^{16}\left|f_j(t_i)-f_j(t_i-1)\right|-\frac{1}{2}\left|\sum_{j=1}^{16}f_j(t_i)-\sum_{j=1}^{16}f_j(t_i-1)\right| \qquad (1)$$

where $f_j$ is the $j^{th}$ filter element $t_i$ is the $i^{the}$ time interval $i$=0, 1,.... number of time elements which yields a normalized measure of spectral change. These differences shown as $D_1$ through $D_{54}$ are stored in a spectral difference register 29. The collection of differences determines the spectral difference curve 31 shown immediately above the register 29.

All elements from the spectral difference register are summed in a spectral difference accumulator 33 to yield the total spectral difference $$D=\sum_i d_i \qquad (2)$$

Time compression is attained by dividing the spectral difference curve 31 by a predetermined fixed number of time increments to which the spectra are to be compressed, to be called the spectral difference increments. The present example is illustrated as using 10 equal-area segments. The spectral difference increments are obtained by dividing the total spectral difference D value by 10 through the use of a divider 35.

The spectra stored in the spectral data array 25 that correspond to the time duration of each spectral difference increment from the output of divider 35 are averaged to obtain a single spectral value to represent these data points. This is performed for each filter this derived spectrum will be referred to as a pseudospectrum which is an average of one or more spectra. To accomplish this, the spectral difference register 29 is shifted into a difference accumulator 39 and simultaneously each filter history in the spectral data array is shifted into an averaging circuit 37. After each shift, the content of the difference accumulator 39 is subtracted from the spectral difference increment from divider 35. When the difference of the subtraction operation is less than or equal to 0, the contents of the averaging circuits $AV_1$ through $AV_{16}$ are transferred to the compressed data array 41. The averaging circuits 37 and the difference accumulator 39 are reset and the residue, if any, for the subtraction is set into the difference accumulator by means of line 43 as an initial value and the cycle is repeated. After 10 iterations of this operation, the compressed data array is completely filled with the 10 pseudospectra $P_1$, $P_2$, ......$P_{10}$ regardless of the time duration of the original speech utterance. The data in the compressed data array is then used as a fixed format input to a known pattern classifier 23 where it is compared to a set of previously derived reference functions. The derivation of these reference functions and the subsequent recognition process used may be similar to that described by N. Nilson in the text, "Learning Machines," 1965, McGraw-Hill, Chapters 1 and 2.

Specific implementations of the coding compressor and timing and control are described with reference to FIGS. 3*a*, *l 3b* and 4*a*, 4*b*.

Figure 3A:
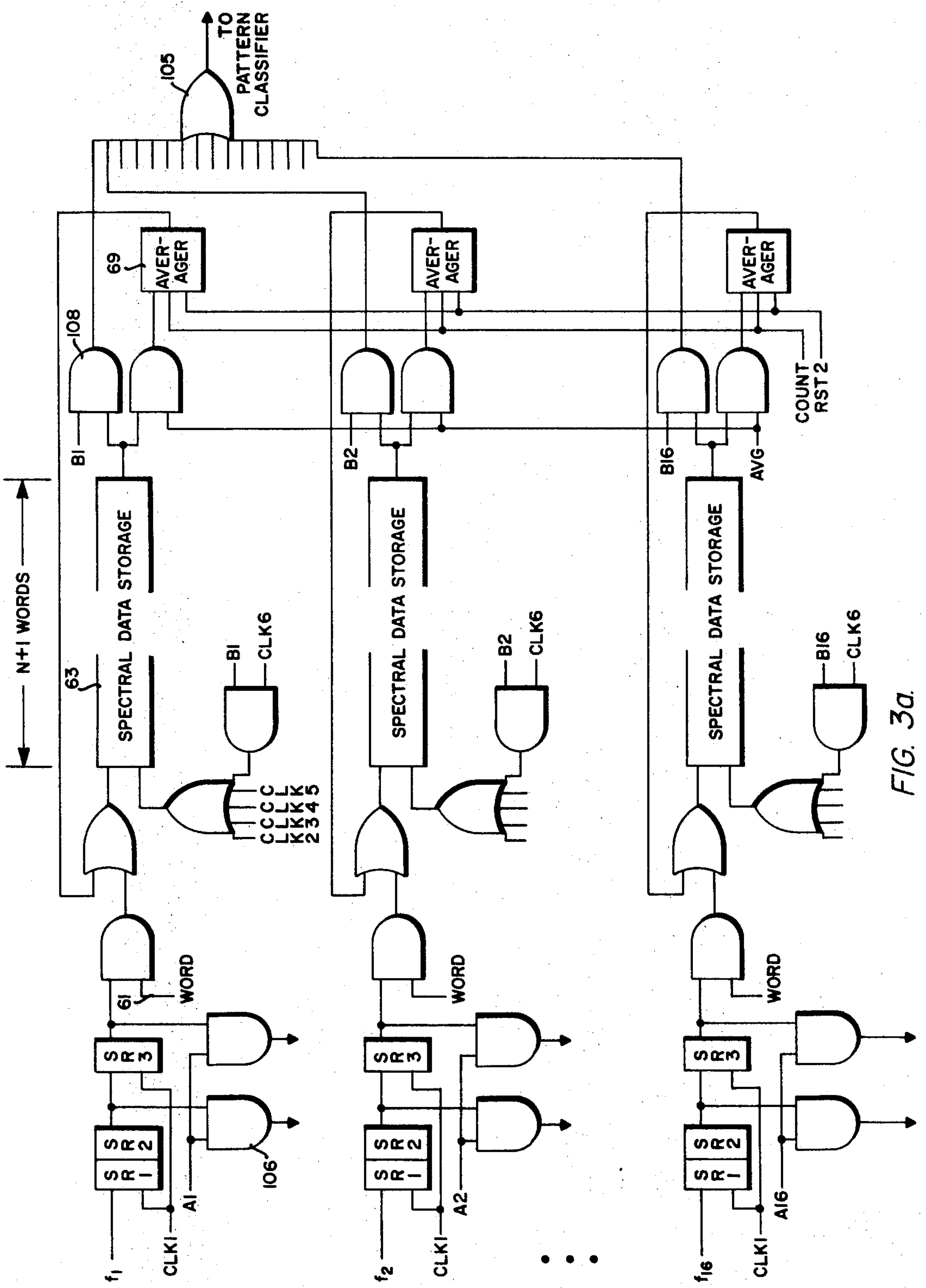
Figure 3B:
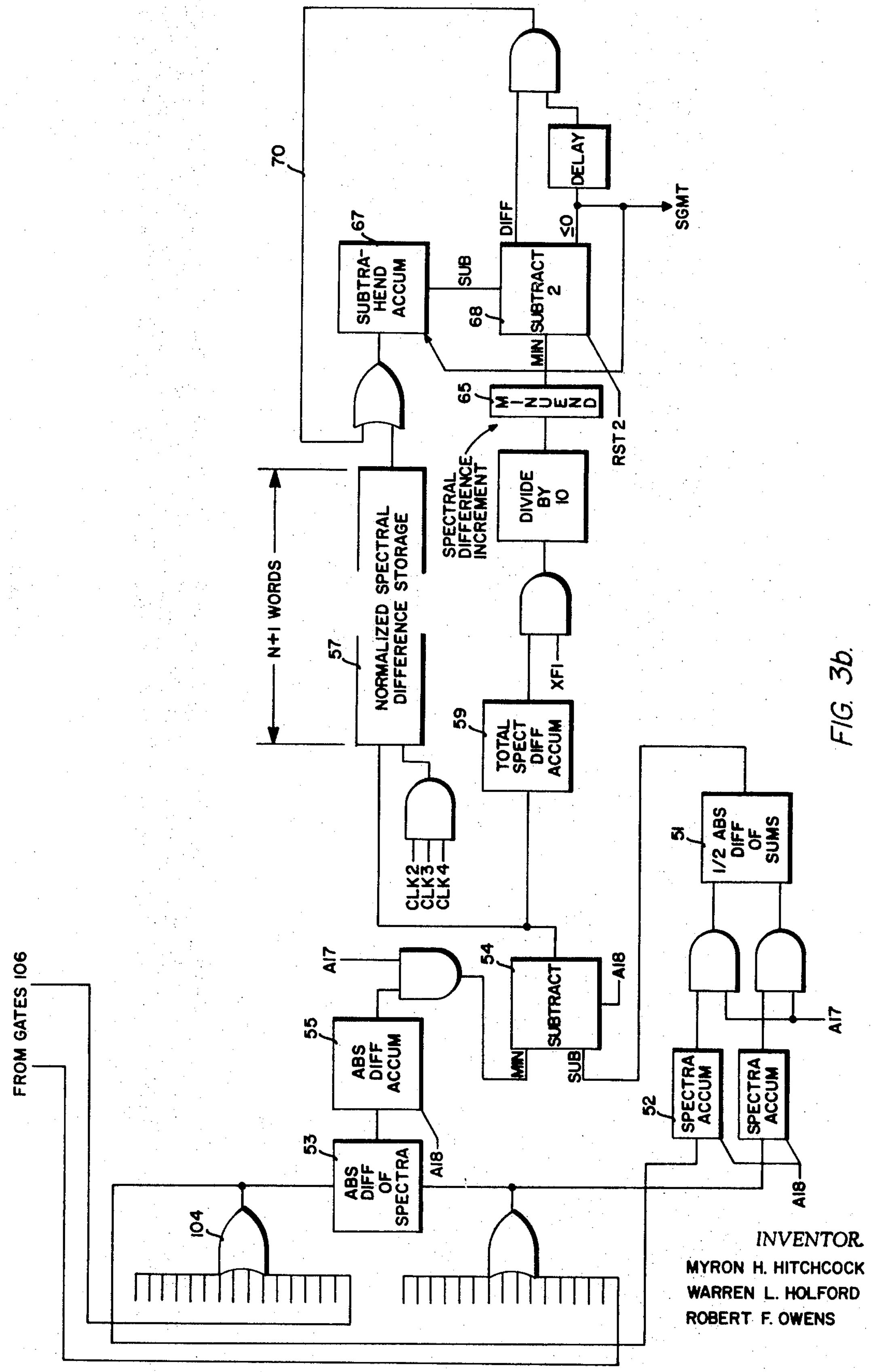
Figure 4A:
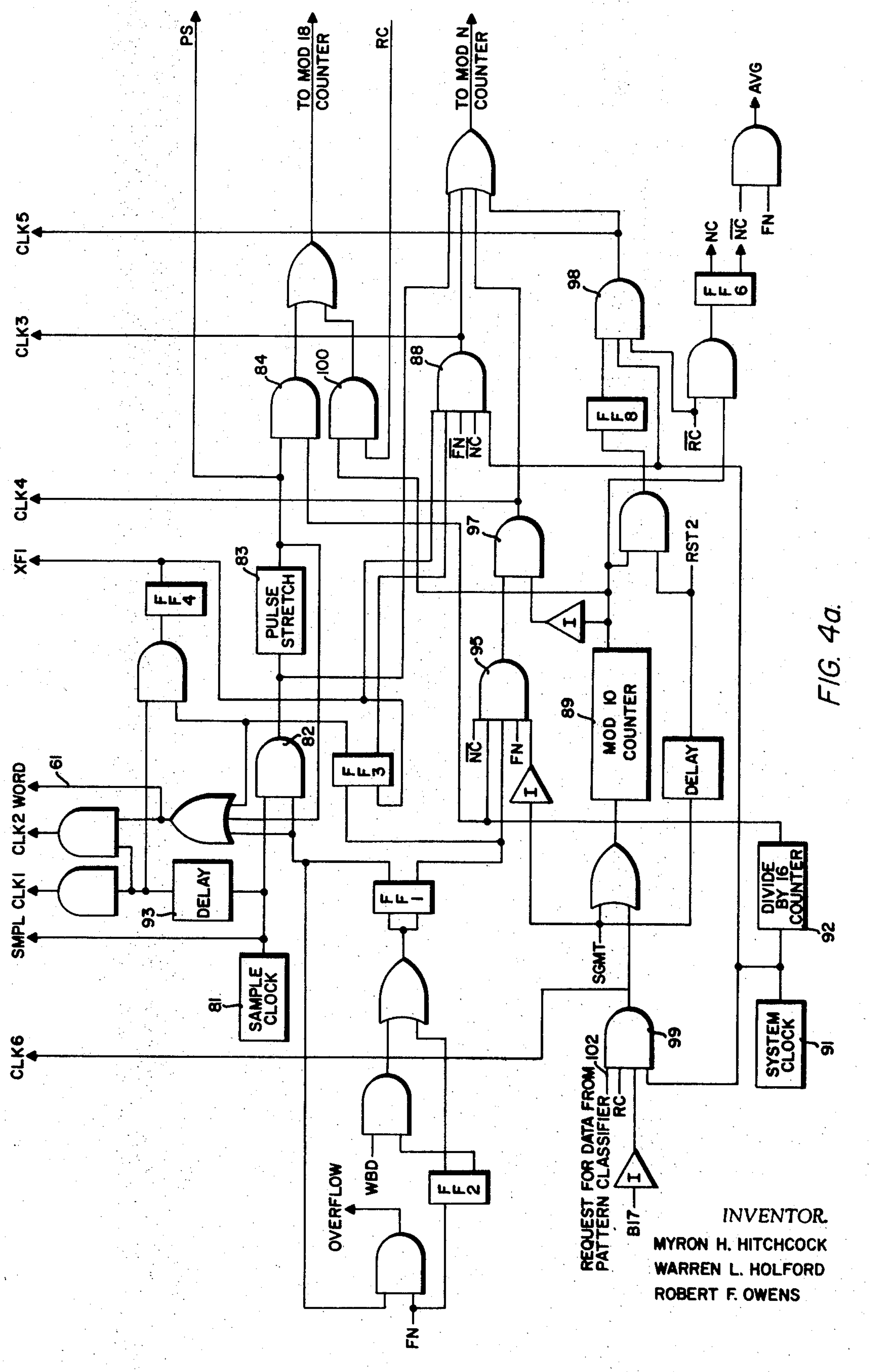
Figure 4B:
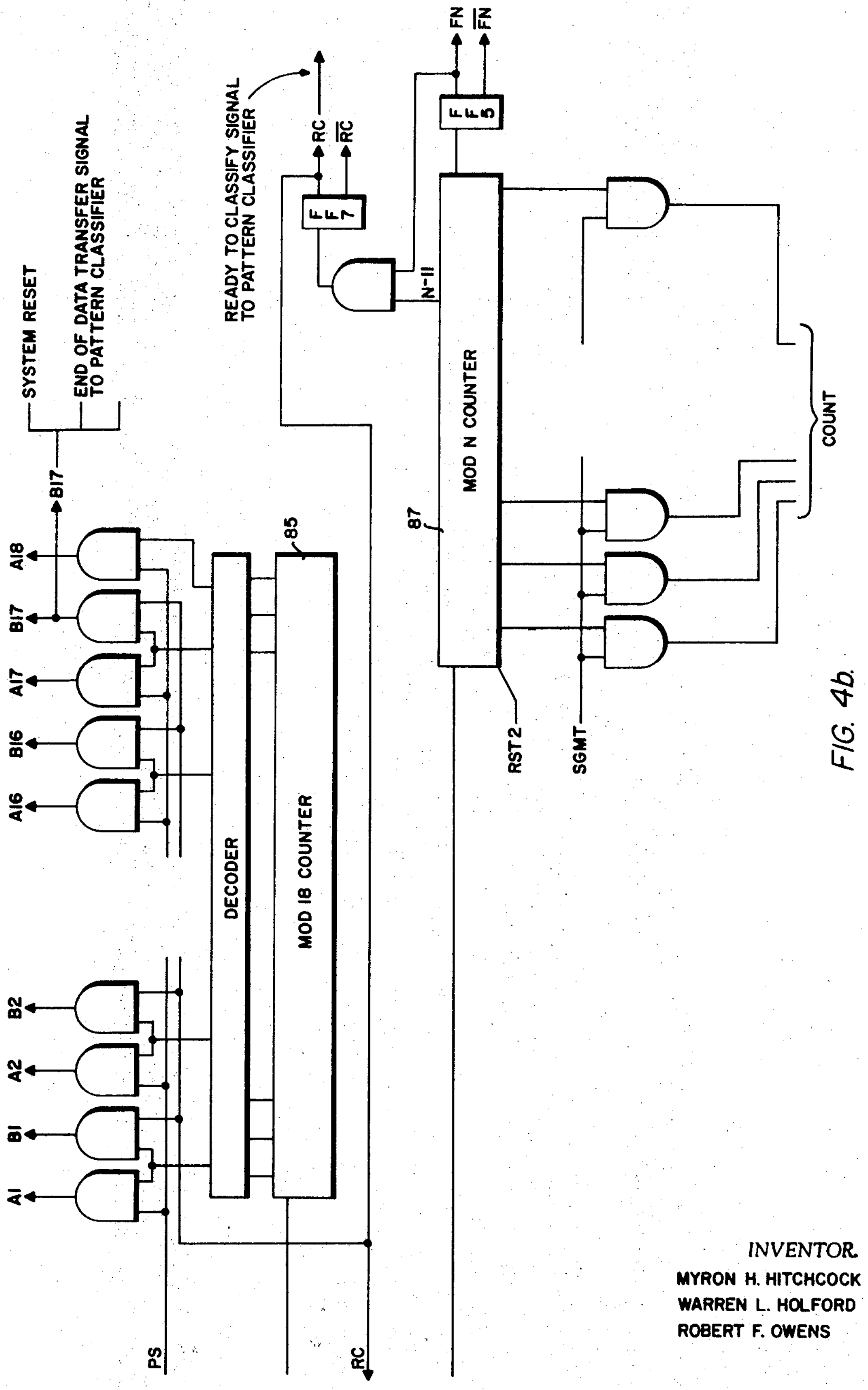

FIG. 3*a*, 3*b* is a logic diagram of the coding compressor. It is to be understood that the open lines in both FIGS. 3*a*, 3*b* and 4*a*, 4*b* denote interconnection between the FIGS. The exceptions include the open lines to OR gates 104 and 105 which are inputs from the transfer gates 106 and 108 respectively, and the other clearly labeled inputs. Clock signal CLK1 developed in the timing and control circuitry of FIG. 4*a*, 4*b* provides the shift pulses to the storage registers SR1, SR2 and SR3 for each filter output $f_1$ through $f_{16}$. The analog-to-digital converter 17 is continually transferring spectral data from the 16 band-pass filters to SR1, SR2 and SR3 and clock signal CLK1 insures that these registers contain the three most recently converted spectra. It has been empirically derived that three spectra samples of word are required before enough spectral energy is sensed by the work boundary detector to detect "beginning of word." Therefore, always storing the three most recently converted spectra, compensates for the response time of the word boundary detector in declaring "-beginning of word."

Once "beginning of word" is indicated, control lines A1 through A16 are sequentially set to transfer spectra stored in SR3 and SR2 for each filter output $f_1$ through $f_{16}$, to the spectra accumulators 52. For the first iteration, SR3 and SR2 will contain time samples; $t_1$ and $t_2$, respectively; therefore, $$\sum_{j=1}^{16} f_j(t_1) \text{ and } \sum_{j=1}^{16} f_j(t_2)$$

are calculated. Spectra $t_1$ and $t_2$ are simultaneously transferred to the absolute differencing circuit 53 with the differences being accumulated in the absolute difference accumulator 55, thus performing the summation of absolute difference of adjacent spectra calculation $$\sum_{j=1}^{16} f_j(t_2) - f_j(t_1)$$

When control line A17 is activated, data is transferred from the spectra accumulators 52 to the absolute difference of sums circuit 51 where $$\left| \sum_{j=1}^{16} f_j(t_2) - \sum_{j=1}^{16} f_j(t_1) \right|$$

is calculated. The resulting difference is divided in half by a single right shift of the difference register, and transferred to the subtrahend register (not shown) in subtractor 54. Control line A17 has also enabled the summation of the absolute difference to be transferred to the minuend register (not shown) of subtractor 54. Control line A18 then initiates the subtractor 54 resulting in the normalized spectral difference value $d_1$ ($d_1$ in equation 1). The normalized spectral difference is then simultaneously transferred to the normalized spectral difference storage register 57, and to the accumulated spectral difference accumulator 5.

When the "beginning of word" is detected, the word control line 61 is also set permitting the spectra to be shifted into the spectral data storage register 63 utilizing the clock line CLK2 which is also enabled by "beginning of word." The clock rate of the processing is so much greater than the sampling clock rate that there is sufficient time between samples to perform the entire spectral difference calculation. The spectra transferred into the coding compressor are accepted until either the "end of word" or the spectral data storage register 63 is full, with the spectral difference calculations being made each time a new set of spectra are accepted.

When end of word is detected, and time has been allowed for the completion of the final normalized spectral difference calculation, control line XF1 is activated and the value in the total spectral difference accumulator 59 is divided by the predetermined number of increments to which the spectra are to be compressed. The present example is illustrated as using 10 equal-area segments. The resulting quotient, called the spectral difference increment, is transferred to the minuend register 65.

In most situations, once end of word is detected, the full storage capacity will not have been utilized. To insure that only correct data is being used in the compression operation, the spectral data and normalized spectral differences must be positioned with their first value in the rightmost storage word of each register. Clock line CLK3 is used to perform this right-justify operation. At the completion of this operation, control line AVG is activated to allow the spectra to be transferred to the averager circuits 69 during the compression operation.

Next, the data in the spectral data storage registers 63 and the normalized spectral difference storage register 57 are simultaneously shifted out by clock signal CLK4. As each value is shifted out of the normalized spectral difference storage register 57, it is accumulated by subtrahend accumulator 67 and subtracted in subtractor 68 from the spectral difference increment minuend 65, while the data from the spectral data storage registers 63 are accumulated in the corresponding averagers 69. Once the accumulated value in the subtrahend 67 is equal to or greater than the value in the minuend 65 within subtractor 68, then the segment control line SGMT inhibits the shifting clock line CLK4 and resets the subtrahend accumulator 67. The segment control line also enables the line COUNT. The number of spectra contributing to the accumulated value in averagers 69 has been counted by MOD N counter 87. The COUNT line transfers this number to averagers 69 so that a true average value will be calculated. These average values are transferred to the first position of the spectral data storage register 63. AFter a short delay, segment SGMT transfers the difference of the subtractor 68 operation into the subtrahend accumulator 67 via line 70 as the initial value for the next iteration. This cycle is repeated nine more times so that spectral data is now represented as a sequence of 10 pseudospectra with the compressed data array located in the first 10 positions of each of the 16 spectral data storage registers 63. Clock line CLK5 is then activated and the compressed data array is right-justified within the spectral data storage register 63, and the system is ready to transfer data to the pattern classifier.

Turning now to FIG. 4*a*, 4*b*, the frequency of the sample clock 81 is selected for the optimum rate of sampling spectra from the 16 band-pass filters. The illustrative example assumes a 60 Hertz sample clock. The system clock 91 is a high frequency crystal (not shown) used for all arithmetic operations and certain high-speed shift commands. In the illustrative example, the frequency of the system clock is 625 KHz. The system clock is divided by 16 in counter 92 for the majority of shifting operations since in most cases an arithmetic operation must be performed between each shift.

The signal (SMPL) is used as a continuous sample signal to the analog-to-digital converter. The converted data is clocked through the first three storage registers by the clock signal CLK1 which is SMPL delayed by a time greater than either the conversion time of the analog-to-digital converter or the full cycle time of the module 18 (MOD18) counter 85. In the illustrative example the complete cycle time of the MOD18 counter is approximately 2½ times larger than the conversion time of the analog-to-digital converter; therefor, the delay 93 is set to be slightly greater than this value.

The timing and control is initiated by a signal from the word boundary detector indicating the "beginning of word." Providing that FF2 is not set, indicating that the processing of the previous utterance has not been completed, the "-beginning of word" signal sets FF1 which enables the AND gate 82, clock line CLK2, and sets WORD control line 61 which allows spectra to be shifted into the spectral data storage registers. The AND gate 82 allows the next sample clock pulse to trigger pulse stretcher 83 which lengthens the positive portion of the waveform to a time slightly greater than the complete cycle time of the MOD18 counter. This elongated pulse from pulse stretcher 83 enables the AND gates of control lines A1 through A18 and enables the AND gate 84 which allows the system clock 91, divided by 16 in counter 92, to advance the MOD18 counter through one complete cycle. It also allows the WORD line 61 to remain set and clock line CKL2 to be enabled until after the spectral differences have been calculated in the event "end of word" resets FF1 during this time. The timing has been designed to generate shift clocks CLK1 and CLK2 after the calculation of spectral differences to allow the same clock to shift spectral data and normalized spectral difference data when the spectrum of a word is being loaded into the coding compressor. It also allows processing to be performed during the setting time of the analog-to-digital converter which reduces the system processing time.

The first 16 counts of the MOD18 counter 85 sequentially activates control lines A1 through A16 which gate spectra samples stored in SR3 and SR2 from each filter simultaneously to circuitry that accumulates each of these values and to circuitry that accumulates the absolute differences of these two values. Count 17 activates line A17 which transfers the contents of the two spectra accumulators to the absolute difference circuitry, the output of which is divided in half by a single shift and transferred to the subtrahend register in subtractor 54. Line A17 also transfers the contents of the absolute difference accumulator 55 to the minuend register of subtractor 54. Count 18 activates line A18 which transfers the difference value from subtractor 54 to the normalized spectral difference storage register 57 and the total spectral difference accumulator 59. Line A18 also resets the two spectra accumulators 52 and the absolute difference accumulator 55. The pulse stretcher 83 then returns to its stable state after allowing enough time for a shift pulse to be generated on clock line CLK2 by delay 93 and inhibits any further clock pulses from counter 92 to the MOD18 counter 85. This iterative operation is continued until either the word boundary detector indicates "end of word" or the total storage capacity of the system is sued and an overflow condition is indicated. The modulo N(MOD N) counter 87 is used to record the number of sample clock pulses that are gated through AND gate 82. If a count of N is ever reached in this mode of operation, FF5 is set and signal FN is generated which sets FF2, and then the output of FF2 resets FF1. In the event of an overflow, the processing continues as if "end of word" had been indicated and an overflow light (not shown) is energized on the control panel.

When FF1 goes to its reset state, FF3 is set, which allows WORD control line 61 to remain set and clock line CLK2 enabled. Since the spectra in storage register SR2 was utilized in the normalized spectral difference calculation and after the calculation was shifted to SR3, one more clock pulse must be generated to shift the spectral data in the spectral data storage registers 63. FF3 being set allows FF4 to be set on the first delayed sample clock pulse after "end of word" which activates control line XF1. FF4 then resets FF3 after the single clock pulse required on clock line CLK2 has been generated.

If less than the maximum storage capacity has been utilized, the spectral data and normalized spectral differences must be justified in their storage registers before the next phase of operation. Since the MOD N counter has been recording the number of sample clock pulses, once FF4 has been set and FF3 has been reset, AND gate 88 is enabled allowing the system clock 91 to drive clock line CLK3 and to clock the MOD N counter 87. Once a count of N is reached, FF5 is set, control line $\overline{FN}$ goes low inhibiting AND gate 88 and enabling AND gate 95 which initiates the timing for the next phase.

When AND gate 95 is enabled, the MOD10 counter 89 is not at the 10th count; thus, the clock pulses from counter 92 are present on clock line CLK4, with the MOD N counter being utilized to count the number of clock pulses transmitted on CLK4. When the segment control line (SGMT) is set by subtractor 68, AND gate 95 is inhibited turning off CLK4, MOD10 counter 89 is advanced one count, and the binary value of the MOD N counter is transferred by the COUNT line to the averagers 69. After a time delay long enough for the averagers 69 to complete their processing and for the subtrahend accumulator 67 to be set to its initial value, reset signal RST2 is generated, resetting the MOD N counter 87 and the subtractor 68, which clears the SGMT line and allows another iteration of the compression timing to be performed.

After 10 iterations, the MOD10 counter 89 inhibits AND gate 97 and no further counter 92 clock pulses are transmitted to clock line CLK4 and the MOD N counter. The MOD10 counter also sets FF6 which generates a signal NC indicating end of the compression operations and, subsequently, signal line AVG is cleared and AND gate 95 is inhibited.

Since the compressed data array is exactly 10 data words in length, to right-justify this block of data in the spectral data storage registers 63, N 1—10 or N—9 clocks will be required. To accomplish this, the count of 10 in the MOD10 counter and the reset signal RST2 set FF8 which enables AND gate 98, allowing the system clock 91 to drive clock line CLK5 and to clock the MOD N counter. When a count of N—9 is reached, FF7 is set generating a ready to classify signal RC that is transmitted to the known pattern classifier. Signal RC inhibits AND gate 98, turning off CLK5, enables AND gate 100 and allows AND gate 99 to be enabled upon a request for data from the linear pattern classifier through line 102. RC also enables the AND gates of control lines B1 through B16. When a request for data from the pattern classifier 23 is received, AND gate 99 is enabled allowing the system clock to drive clock line CLK6 and MOD10 counter 89. Every time MOD10 counter 89 completes one cycle, MOD18 counter 85 is advanced one count, sequentially activating control lines B1 through B16. When a count of 17 is reached on MOD18 counter 85, line B17 is activated which inhibits AND gate 99, turning off CLK6. Line B17 also indicates to the known pattern classifier end of data transfer and resets the entire system.

The above description and accompanying drawings set forth one specific implementation of the speech interpretation system of the present invention. For purposes of clarity, particular timing sequences have been used together with defined components and subcomponents. It is to be understood that different timing sequences could be chosen and equivalent components could be substituted therefor without departing from the basic concept of the invention. As indicated above, it is again noted that the invention is not limited to speech interpretation since it is applicable to the interpretation of other time-varying signal inputs.

We claim:

1. A speech interpreter system comprising
   word boundary detector means for identifying the beginning and end of a speech utterance,
   spectrum analyzer means having a plurality of filters, said speech utterance being the input to said analyzer,
   coding compressor means coupled to the output of said analyzer means and gated by said boundary detector for recoding the output of said analyzer as a function of the rate of change of the time-varying speech utterance data, said compressor means reducing each individual speech utterance to a sequence of fixed number of pseudospectra regardless of the length of said utterance, and
   pattern classifier means coupled to the output of said compressor means for comparing said output to a set of previously derived reference functions.

2. The speech interpreter of claim 1, wherein said coding compressor means performs the following functions:
   1. computes the differences between successive pseudospectra to yield a normalized measure of spectral change,
   2. stores the differences in a spectral difference register, 3. sums all elements of said difference register in a difference accumulator to yield a total spectral difference curve,
4. obtains a spectral difference increment by dividing said difference curve by said fixed number of pseudospectra.

3. A system for interpreting time-varying signal data comprising
a spectrum analyzer having a plurality of filters for analyzing said time-varying signal data,
a boundary detector for identifying the beginning and end of individual components of said signal data,
coding compressor means for reducing each individual signal data to a sequence of a fixed number of pseudospectra coupled to the output of said spectrum analyzer and gated by said boundary detector for recoding said signal data as a function of the rate of change of said data, and
a pattern classifier for comparing the output of said coding compressor to a set of previously derived reference functions.

4. A speech interpreter comprising
a spectrum analyzer coupled to a source of time-varying speech utterances,
a word boundary detector coupled to said source of speech utterances,
an analog-to-digital converter coupled to the output of said spectrum analyzer,
coding compressor means for reducing each individual speech utterance to a sequence of a fixed number of pseudospectra regardless of the length of said utterance coupled to the output of said converter for recoding said speech utterances as a function of the rate of change of individual utterances,
pattern classifier means coupled to the output of said compressor for comparing said output to a set of previously derived reference functions, and
timing and control means coupled between said boundary detector and said compressor for gating said compressor.

5. A system for compressing time-varying signal data for the purpose of pattern recognition comprising
a boundary detector for identifying the beginning and end of individual components of said signal data, and
coding compressor means for accepting said identified signal data and recoding said signal data as a function of the rate of change of said data,
said compressor means reducing each individual signal data to a sequence of fixed number of pseudospectra regardless of the length of said data,
said coding compressor having a data format output adapted for pattern recognition purposes.

6. A method of interpretation which comprises
spectrally analyzing a speech utterance to obtain a data array of a plurality of frequencies,
gating said data array by means of a word boundary detector to a spectral data array,
computing the differences between successive spectra in said spectral data array,
storing said differences in a spectral difference register to obtain a spectral difference curve,
summing all elements of the spectral difference register in a spectral difference accumulator to yield a total spectral difference,
obtaining a spectral difference increment by dividing said total spectral difference by a predetermined fixed number of time increments to which the spectra are to be compressed,
averaging the spectra stored in said spectral data array corresponding to the time-duration of each spectral difference increment to obtain a single pseudospectral value for each filter,
transferring said psuedospectral values to a compressed data array, and
comparing the data in the compresses data array to a set of previously derived reference functions in a pattern classifier.